Aug. 25, 1964 L. S. CONOVER, JR 3,146,345

COUNT-SHIFT REGISTER

Filed Feb. 3, 1961 3 Sheets-Sheet 1

INVENTOR
Louis S. Conover, Jr.
BY Pennie, Edmonds, Morton, Barrows & Taylor
ATTORNEYS INVENTOR
Louis S. Conover, Jr.
BY
Bernie Edwards Morton Bowers Taylor
ATTORNEYS INVENTOR
Louis S. Conover, Jr.
BY
Pennie Edmonds Morton Barrows & Taylor
ATTORNEYS United States Patent Office 3,146,345 Patented Aug. 25, 1964

3,146,345

COUNT-SHIFT REGISTER

Louis S. Conover, Jr., North Babylon, N.Y., assignor to Cutler-Hammer, Inc., Milwaukee, Wis., a corporation of Delaware Filed Feb. 3, 1961, Ser. No. 87,022
4 Claims. (Cl. 235—170)

This invention relates to a count-shift register.

In computer and other types of data handling systems, shift registers are often employed. For example, they may be used to convert successively recurring bits of binary-coded signals to a stationary sequence of a selected number of bits for read-out and control purposes. They may also be utilized in a recirculating memory to store the coded information and permit read-out at desired times. Such read-out may occur simultaneously for selected bits, or successively as the bits circulate.

Where it is desired to count as well as store information, the conventional shift register may be supplemented by other means for adding a count to a previously stored total, and the new total then recirculated. However, this requires considerable additional circuitry and may reduce the overall speed of operation.

In accordance with the present invention, a count-shift register is provided which is capable of functioning as a conventional shift register in the absence of new information. and also is capable of adding counts to previously stored totals without impairing overall speed of operation.

Figure 1:
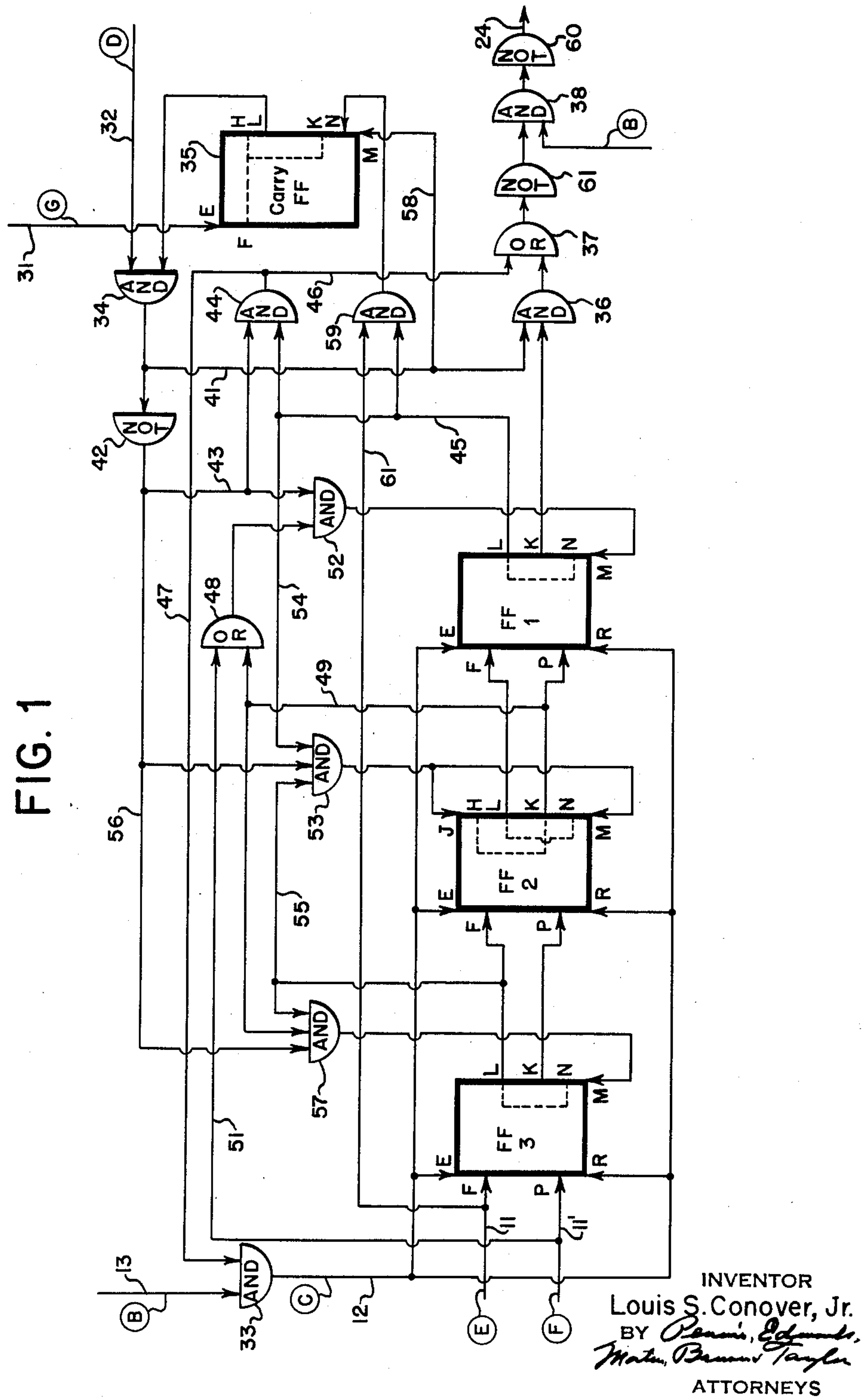
FIG. 1 is a circuit diagram of a count-shift register in accordance with the invention.

The count-shift circuit of the invention is shown in FIG. 1. However, its operation will be understood more readily if the other figures are described first.

Figure 5:
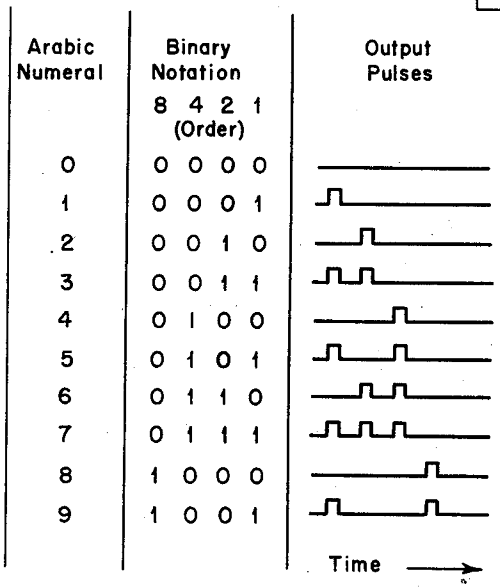
FIG. 5 illustrates the binary code used in connection with FIG. 1.

FIG. 5 shows the binary code used in this specific embodiment of the invention. The first column shows Arabic numerals 0 through 9. The corresponding binary notation is shown in the second column. Four binary bits are required for one decimal place, and the weighting or "order" of the bits is indicated. Each bit may be 0 or 1, and the combination of the four bits for each Arabic numeral is shown. In this embodiment the pulses issue from the count-shift register in succession, and the third column shows the output pulse sequence corresponding to each Arabic numeral.

FIG. 5 shows the various combinations for one decimal place. For additional decimal places there will be additional sets of four binary bits, the sets occurring successively.

Figures 2A, 2B:
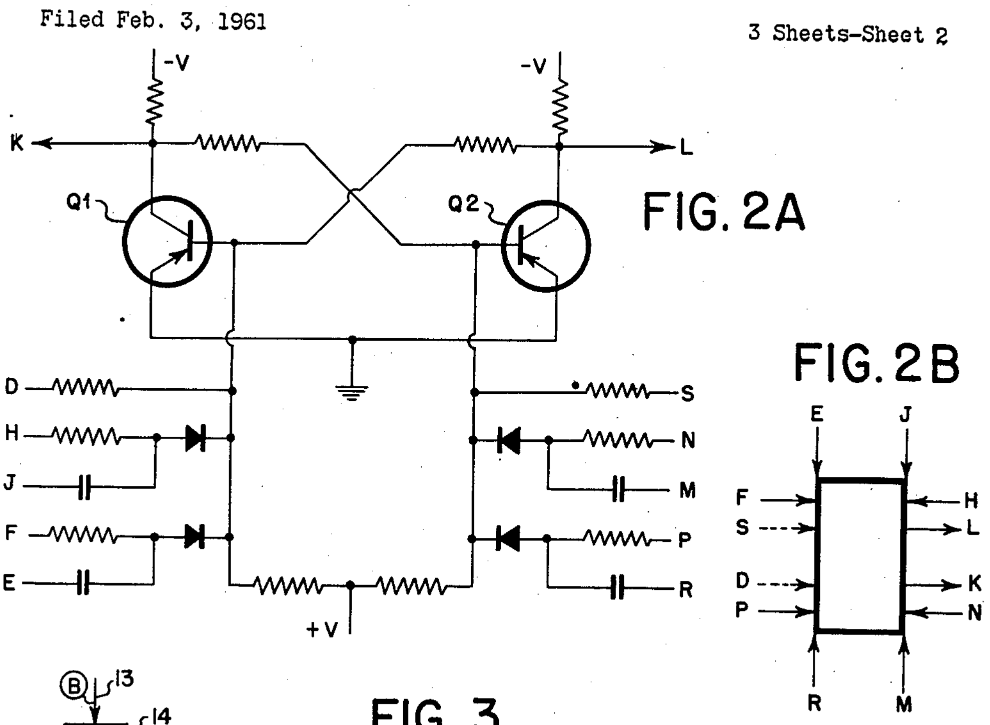
FIGS. 2A and 2B show a representative flip-flop unit which may be used in FIG. 1, and a diagrammatic representation thereof.

FIG. 2A is a diagram of a bistable multivibrator or "flip-flop" unit (FF) which is suitable for use in the count-shift register of FIG. 1. It comprises two PNP transistors Q1 and Q2 with grounded emitters and cross-connected bases and collectors. The collector loads are resistors leading to a power source denoted —V. The bases are connected through high resistances to another power source denoted +V. Triggering input circuits are connected to the bases of both transistors. Input D is for D.-C. level control and inputs H and F are D.-C. inputs through diodes which prevent current flow in the reverse direction. J and E are A.-C. triggering inputs. The inputs for Q2 are similar.

Assuming Q1 to be conducting, its collector will be at very nearly ground potential and the potential of K will be substantially ground. By the cross-connection, Q2 will be cut off and the potential at L will be substantially —V. Q1 is changed from conducting to non-conducting states by making its base positive to the ground. This may be accomplished by applying pulses to J or E, triggering being produced by the positive-going edges of the pulses. Inputs H and F allow levels to be established which must be overcome by pulse inputs at J and E, respectively. When Q1 is rendered non-conducting, the potential of K goes to substantially —V and, by the cross-connection, Q2 becomes conducting and the potential at L goes in the positive direction to substantially ground.

By applying positive levels to S, N or P, Q2 can be changed from conducting to non-conducting stages, and similarly for the positive-going edges of pulses applied to M or R.

This type of bistable multi-vibrator or flip-flop is well known in the art, and commercial units are available. By suitably interconnecting inputs and outputs, or using various combinations of input connections, many types of logic functions can be performed. Not all of the inputs shown are actually used in FIG. 1.

FIG. 2B is a diagrammatic representation of FIG. 2A with the inputs and outputs denoted by the same letters. This representation is used in FIGS. 1 and 3.

It will be understood that this circuit is given by way of example only and that many alternatives are known in the art and may be used if desired, with suitable change of connections as required.

Figure 3:
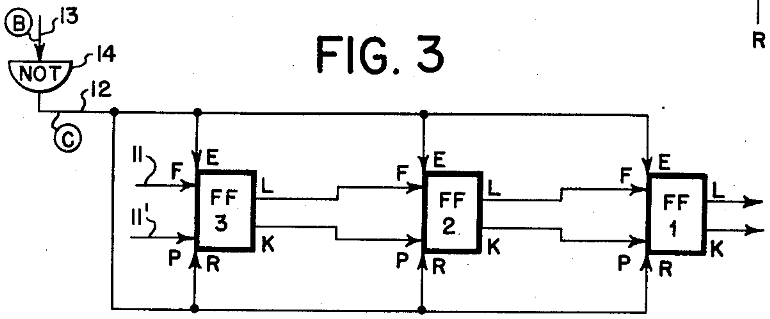
FIG. 3 illustrates a conventional shift register.

FIG. 3 shows a portion of FIG. 1 with only those connections involved in operation as a simple shift register. Three FF units are interconnected as shown. Input pulses are applied through line 11, 11' to the F and P terminals of FF3. Representative waveforms for the input signals are shown at (*e*) and (*f*) of FIG. 7 for a coded "3" and a coded "5." The bit intervals are shown at (*a*) and are numbered 1, 2, 3, 4, 1, etc., corresponding to the four bits for a given decimal place. The inputs to F and P will be positive-going and negative-going pulses, respectively, for a "1." For a "0," the input 11 will be at the negative level and that at 11' at the positive level, the positive level being ground for an FF unit as shown in FIG. 2A.

Figure 7:
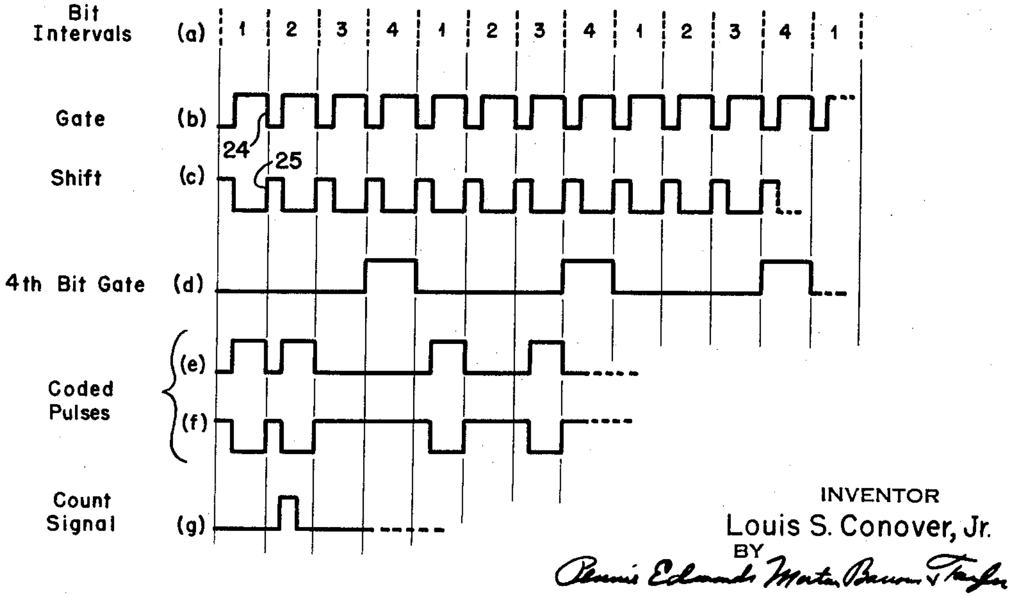
FIG. 7 shows illustrative waveforms for FIGS. 1 and 3.

Shift pulses are applied to line 12, and may be of the type shown at (*c*) of FIG. 7. They are here obtained by applying gate pulses as shown at (*b*) of FIG. 7 through line 13 to NOT 14 which inverts the polarities.

In FIGS. 1 and 3 capital letters in a circle are shown adjacent lines in which the waveforms shown in corresponding lower case letters in FIG. 7 appear.

FIG. 3 utilizes a semi-circular symbol denoted "NOT," and FIG. 1 will use the same symbol and also symbols with "AND" or "OR" therein. These are conventional components well known in the computer field. Summarizing their functioning at this point, an "AND" gate or circuit gives an output only when all inputs are present. An "OR" circuit or gate gives an output when any one or all input signals are present. In both cases the output polarity is commonly the inverse of the input polarity. A "NOT" circuit is essentially an inverter, that is, an input of one polarity will give an output of the opposite polarity.

The relative magnitudes of the signal pulses in lines 11, 11', and the shift pulses in line 12 are selected so that the condition of FF3 can only be changed when a plus level on F or P coincides with a positive-going edge of a shift pulse on E or R. The same relationship obtains for input pulses at F and P and shift pulses at E and R of succeeding FF units.

In FIG. 3 is assumed that a negative level of an L output terminal represents "0," and a positive level (actually ground) represents "1." Assuming all three FF units initially in the "0" condition, the negative outputs at L correspond to the non-conducting condition of Q2 and conducting condition of Q1 therein. If, now, a positive signal pulse appears in line 11, when the shift pulse goes positive at the end of the bit interval. Q1 in FF3 will be cut off, thus giving a positive output (actually ground) at L thereof. The negative-going signal pulse at P prevents triggering of Q2. Thus, FF3 is now in the "1" condition. The conditions of FF2 and FF1 are unchanged, since the positive-going trailing edge of the shift pulse has passed before a positive signal from L of FF3 is supplied to F of FF2.

If another positive signal pulse arrives during the next shift interval, FF3 will remain in the same condition, still giving a "1" output. However, FF2 will now change to its "1" state, due to the positive input from L of FF3 when the shift pulse is effective. FF1 remains unchanged, since the shift pulse has passed before L of FF2 goes positive.

If there is no signal pulse in lines 11, 11' during the next shift interval, representing an "0," F of FF3 will be negative and P will be positive. Accordingly, Q2 in FF3 will be cut off at the end of the shift pulse, giving a negative output at L. FF2 will remain in its "1" state since that was the previous state of FF3. FF1 will now assume its "1" state corresponding to the previous state of FF2.

The overall operation will be illustrated by reference to FIG. 4, assuming that coded pulses corresponding to the numeral 3 are applied to the shift register. From FIG. 5 it will be seen that numeral 3 corresponds to two "1" pulses for the first two bits and no pulses or "0" for the next two bits.

Figure 4:
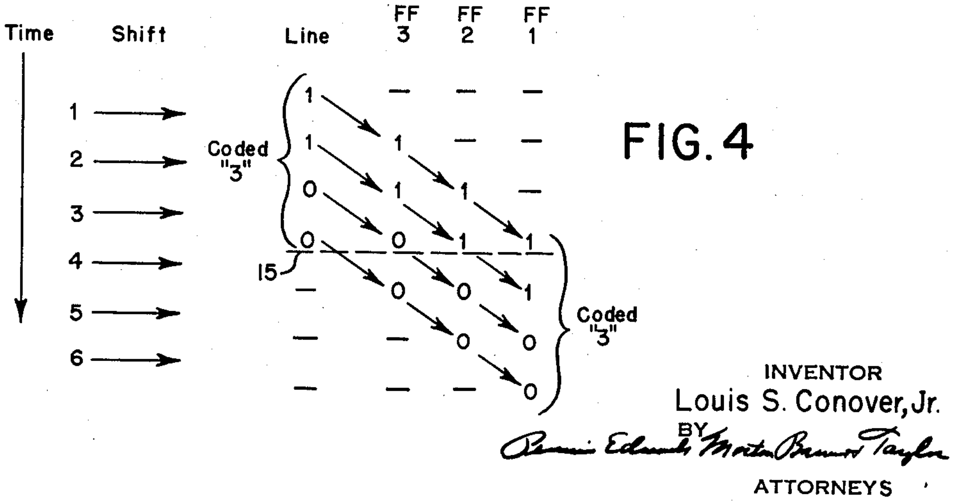
FIG. 4 is an example of operation of the register of FIG. 3.

In FIG. 4 the three FF units are assumed to be initially in their "0" state. When a "1" bit pulse is applied to the input of FF3, denoted "LINE," and the first shift pulse occurs as shown by the horizontal arrow 1, FF3 assumes its "1" state and the other two remain unchanged. Shortly thereafter, another "1" bit is applied to FF3, as shown in the second line. Upon the occurrence of shift pulse 2, FF3 continues in its "1" state and FF2 goes to the "1" state corresponding to the previous condition of FF3. During the third bit interval there is a "0" input to FF3. Consequently, upon the occurrence of shift pulse 3, FF3 will change to its "0" state, FF2 will assume a "1" state, and FF1 a "1" state. If no further "1" input signals arrive, the operation will continue until all FF's have reverted to their "0" state. The progression is shown by the sloping arrows.

After four bit-intervals have occurred, the status of the input line (11) and that of the three FF units will be as indicated by the dash line 15. At this time FF1 is in the "1" state and an output pulse will be delivered to "L" thereof, forming the first pulse of the numeral 3. Successive shifts will result in an output pulse sequence shown by the brackets and labelled "Coded '3'." This corresponds to the pulse sequence shown for numeral 3 in FIG. 5.

The operation of shift registers is known per se in the art so that further explanation is unnecessary.

Figure 6:
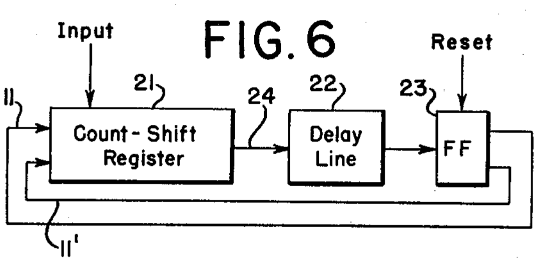
FIG. 6 illustrates a loop storage system employing the count-shift register of FIG. 1.

FIG. 6 shows a count shift register 21 connected in a loop storage system including delay line 22 and FF23. Output pulses from the count shift register pass through delay line 22 and issue therefrom after a desired delay. They are then used to trigger FF23 to give corresponding positive-going and negative-going pulses in lines 11, 11' for a positive pulse on the delay line. F23 is reset by suitable clock pulses to recirculate pulses in precisely timed intervals corresponding to the bit intervals shown at (*a*) of FIG. 7. The trailing edges 24 or 25 of the gate or shift pulses shown in (*b*) and (*c*) may be employed for the purpose, depending on the polarity required for resetting FF23.

Referring now to FIG. 1, the count shift register 21 of FIG. 6 is shown in detail, and it is assumed that its output in line 24 is to be fed to a delay line, as shown in FIG. 6.

In addition to the inputs and outputs in the recirculating loop, count signals may be delivered periodically through line 31 to be added to the count then stored in the recirculating loop. Such a count signal is shown at (*g*) of FIG. 7.

As will be described, a new count is added to the previous total only when four bits representing the first or "units" digit of the stored total are in the shift register. Thus, a 4th bit gate such as shown at (*d*) of FIG. 7 is supplied through line 32. This 4th bit gate occurs during each 4th bit interval, as shown by comparison with (*a*).

Before further describing FIG. 1, the basis for its operation will be given.

During the operation of the shift register, as the four bits representing a given decimal pass therethrough, a condition is reached wherein the states of FF1, FF2 and FF3 correspond to the first three bits, and the states of the input lines to F and P of FF3 correspond to the fourth bit. This is indicated at 15 in FIG. 4. At this time, then, the previously stored digit is known, and it is initially assumed that this corresponds to the first or unit decimal place. Accordingly, upon arrival of a new count signal pulse, it is necessary to increase the stored digit by 1.

Referring back to FIG. 5, whenever 1 is added, the output of the first order flip-flop, FF1, must change from "0" to "1," or vice versa. This suffices when adding 1 to an even number (including 0) since the status of the other bits remain unchanged. For example, changing from 4 to 5 takes place as follows:

(I)

| Time Interval | Input Line | FF 3 2 1 | Output |
|---|---|---|---|
| (1) | 0 | 1 0 0 | 1 |
| (2) | | 0 1 0 | 0 1 |
| (3) | | 0 1 | 1 0 1 |
| (4) | | 0 | 0 1 0 1 |

In this notation, under "Time Interval" are four successive shift pulse intervals. Under "Input Line" and "FF3, 2, 1" are shown the "0" or "1" conditions of the line and FF3, FF2 and FF1. Under "Output" is given the corresponding pulses (1) or no pulses (0) which occur successively.

In the first time interval a coded "4" is present. To add 1, it is necessary to invert the output of FF1 as shown by the bar above the 0, so as to give a 1 in the output. This is accomplished by passing the output of FF1 through an inverting circuit. Conditions of the FF units for successive shifts are shown on successive lines, along with the output pulse sequence. After the 4th shift pulse interval, output pulses will have been delivered corresponding to the numeral 5, as is apparent.

When adding 1 to an odd number, a shift is skipped after the first bit is delivered to the output line. This suffices in changing from 1 to 2. Using the same type of presentation as above:

(II)

| | | |
|---|---|---|
| (1) | 0 0 0 $\bar{1}$ | 0 |
| (2) X | 0 0 1 | 1 0 |
| (3) | 0 0 | 0 1 0 |
| (4) | 0 | 0 0 1 0 |

A new symbol "X" is employed to indicate that that shift is skipped. Consequently, the FF units remain in their previous condition. However, the interval corresponding to the omission of the shift still occurs, so that a signal is delivered to the output line during this interval. Thus, the first shift pulse causes a "1" to issue from FF1 which is inverted to form a "0" in the output. The skip (second) shift interval causes the 1 to again issue from FF1, but this is not inverted. Successive shifts occur in normal manner. From the last line of the output it will be noted that the binary "2" has been delivered to the output line.

When adding 1 to other odd numbers, additional operations need to be performed. Thus, following the same presentation, and changing from 3 to 4:

(III)

| | | |
|---|---|---|
| (1) | 0 0 1 $\bar{1}$ | 0 |
| (2) X | 0 $\hat{1}$ 0 | 0 0 |
| (3) | 0 1 | 1 0 0 |
| (4) | 1 | 0 1 0 0 |

Another new rotation in the form of a caret (∧) has been introduced. This indicates that the state of the corresponding FF unit has been changed by the application of an appropriate pulse thereto. Thus, at the second (skip) shift interval the status of FF1 is changed so that it is now in the "0" condition instead of the previous "1" condition. It will be observed from the last output line that the numeral 4 is delivered to the line.

Following the same presentation, in changing from 5 to 6, the following operations are performed:

(IV)

| | | |
|---|---|---|
| (1) | 0 1 0 $\bar{1}$ | 0 |
| (2) X | $\hat{0}$ $\hat{1}$ 1 | 1 0 |
| (3) | 0 1 | 1 1 0 |
| (4) | 0 | 0 1 1 0 |

In changing from 7 to 8:

(V)

| | | |
|---|---|---|
| (1) | 0 1 1 $\bar{1}$ | 0 |
| (2) X | 1 $\hat{0}$ $\hat{0}$ | 0 0 |
| (3) | 1 0 | 0 0 0 |
| (4) | 1 | 1 0 0 0 |

In changing from 9 to 0:

(VI)

| | | |
|---|---|---|
| (1) | 1 0 0 $\bar{1}$ | 0 |
| (2) X | 0 0 $\hat{0}$ | 0 0 |
| (3) | 0 0 | 0 0 0 |
| (4) | 0 | 0 0 0 0 |

Describing, now, the circuits for performing these operations, in FIG. 1 input signals are introduced to FF3 through lines 11, 11'. Shift pulses are also introduced by supplying gate pulses B to AND 33 which inverts the gate pulses to form shift pulses and supplies them to the FF units through line 12. AND 33 is employed rather than NOT 14 (FIG. 3) since it is desired to gate the shift pulses. Internal connections in the FF units are shown by dotted lines. Thus, in all FF units L is connected to N. In addition, in FF2, H is connected to K.

Since the counting operation is to take place only when the first bit of a decimal digit is in FF1, AND 34 is employed for control. A 4th bit gate is supplied through line 32. Thus AND 34 can open only during the time corresponding to a fourth bit, and at this time the first bit is in FF1.

When a count signal arrives, it triggers carry FF35 to its set condition, thereby supplying a + output from L thereof to AND 34, and the latter opens during the next fourth bit, at which time the units decimal is in the shift register. Provision is made if required, so that a count signal can be applied to line 31 only in the interval at the beginning of a circulating cycle where the four bits of the units decimal digit are stored, and ahead of the initial 4th bit gate.

In the absence of a count, the output of FF1 is from terminal K thereof, and is inverted successively by AND 36, OR 37, NOT 61, AND 38 and NOT 60 to give an optput of opposite polarity in line 24. Thus for a "1" output of FF1, with L positive and K negative, a "1" is fed to line 24. However, a count pulse issuing from AND 34 is negative, thereby closing AND 36 through line 41. At the same time, the count pulse is inverted by NOT 42 and is fed through line 43 to activate AND 44. The latter is fed from output L of FF1 through line 45. The output of AND 44 is connected by line 46 to OR 37. Since L and K of FF1 are of opposite polarity, the signal to output line 24 is opposite in polarity to that which would be fed thereto through AND 36.

Thus whenever a count is added, the effective output of FF1 to line 24 is inverted, as discussed above for Table I.

To skip a shift after the first bit when the number is odd, as illustrated in Table II, the output of AND 44 is utilized. For an odd number, L of FF1 is positive, the output of AND 44 is negative, and this is fed through line 47 to inhibit AND 33, thereby preventing a shift pulse from passing therethruogh.

In changing from 3 to 4, 7 to 8, and 9 to 0, shown in Tables III, V and VI, FF1 must be triggered from "1" to "0" at the time of the skip shift. The conditions indicating that a 3 or 7 or 9 is in the shift register is recognized by OR 48, which has inputs connected to K of FF2 through line 49 and to input line 11' through line 51. Line 49 is negative for 2, 3, 6 and 7, since for these numbers FF2 is in its "1" state (see FIG. 5). Line 51 is negative for 8 and 9, since the input to the shift register is a "1." The presence of 2, 6 and 8 in these groups can be tolerated, since for these numbers FF1 is already in its "0" state. Hence, whenever a 3, 7 or 9 is in the register, the output of OR 48 is positive and enables AND 52.

AND 52 is supplied with the output of NOT 42, which is positive for a count. The corresponding negative output of AND 52 is fed to M of FF1. The internal connection of N to L of FF1 makes N positive (ground) for an odd number. Accordingly, from FIG. 2A, the capacitor of input M is charged and, upon termination of the count cycle at the end of the 4th bit gate, the output line of AND 52 goes positive and triggers FF1 to its "0" state.

In changing from 5 to 6 and 7 to 8, the state of FF2 must be inverted from "0" to "1" and from "1" to "0" respectively, during the skip shift interval, as shown in Tables IV and V. From FIG. 5, 5 and 7 are recognized by a "1" in FF1 and a "1" in FF3. AND 53 has input lines 54 and 55 conected to L of FF1 and FF3, respectively, which are positive under these conditions. It is also connected to the output of NOT 42 through line 56. Accordingly the output of AND 53 goes negative when a count occurs. If FF2 is in its "1" condition, FF2 is triggered to "0" through its M input in the manner just described for FF1. If it is in its "0" condition, a similar operation takes place through the internal connection of the H and K terminals, and it is triggered to "1" through input J.

Finally, in changing from 5 to 6, FF3 must be changed from "1" to "0" during the skip shift interval. The number 5 is uniquely recognized by a "1" in FF1, a "0" in FF2 and a "1" in FF3. However, the last two states are common only to the numerals 4 and 5, and a triggering pulse can be tolerated for 4 since in changing from 4 to 5, FF3 changes from "1" to "0" at the second shift as shown in Table I.

Accordingly, AND 57 has inputs from L of FF3 and K of FF2, as well as a count input from NOT 42. The output of AND 57 is connected to M of FF3, and triggering occurs upon termination of the count pulse, in the manner above described.

In counting up to 9, carry FF35 is reset at the end of the 4th bit gate by connecting the output of AND 34 through lines 41 and 58 to its M input. However, when adding 1 to 9, it is necessary to carry over a 1 to the next digit (tens). The number 9 is recognized by a "1" in FF1 and a "1" in input line 11. These states are fed to AND 59 through lines 45 and 61, and the resultant negative output supplied to terminal N of carry FF35. This prevents the resetting of FF35 and AND 34 will remain enabled, ready to open during the next 4th bit gate to add 1 to the next digit. If further carryovers are required, as in adding 1 to 999, etc., carry FF35 continues in its "set" condition until no further carryover is required.

It may be mentioned that the presence of a "1" in the first bit of the second decimal place will not interfere with the change from 9 to 0 in the first decimal place, since the 4th bit gate will have closed by that time and only shift register operation will be taking place.

Outputs from the count-shift register may be taken as meets the requirements of a particular application. For example, they may be taken from outputs L and K of FF1.

It will be understood that the count-shift register is of general application where counting as well as shifting is desired. One particular application where it was found especially useful is described in copending application Serial No. 87,037, filed February 3, 1961, for "Data Accumulation Systems" by Hallden et al.

Additional gating may be provided for control or other purposes to confine the operation to desired intervals, for extraction of data, for removal of data from further recirculation, etc.

I claim:

1. A count-shift register which comprises a source of shift pulses, a shift register having a plurality of serially-arranged stages therein actuable by said shift pulses to transfer input binary-decimal coded pulses serially, bit-by-bit, through successive stages thereof, means for supplying count signals to said shift register to be added to the coded pulses passing serially therethrough, means for gating said count signals to render them effective only during respective intervals when the bits of a coded digit are in the shift register, means for inverting the output bit from the shift register when a count signal is effective, means for skipping the shift next following said output bit, recognizing means for recognizing the bits of the number in the register at the beginning of a count, and means for inverting the bit in one or more stages of the register in accordance with said recognizing means to yield output bits upon succeeding shifts representing the initial number with 1 added thereto.

2. A count-shift register which comprises a source of shift pulses, a shift register having input and output circuits, said shift register having a plurality of serially-arranged flip-flop stages therein actuable by said shift pulses to transfer input bits of a binary-coded decimal digit serially through successive stages thereof to the output circuit, means for supplying count signals to the input of said shift register to be added to coded digits passing therethrough, means for gating said count signals to render them effective only during respective intervals when the first bit of a coded digit is in the output stage of the shift register, means responsive to a count signal for inverting said first bit in the output circuit of the register, means for skipping the shift next following said output bit, recognizing means for recognizing the states of predetermined flip-flop stages for odd numbers in the register at the beginning of a count, and means for changing the state of predetermined stages in accordance with said recognizing means to yield output bits upon succeeding shifts representing the initial odd number with 1 added thereto.

3. A count-shift register which comprises a source of shift pulses, a shift register having input and output circuits, said shift register having a plurality of serially arranged flip-flop stages therein actuable by said shift pulses to transfer input bits of a binary-coded decimal digit serially through successive stages thereof to the output circuit, means for supplying count signals to the input of said shift register to be added to coded digits passing therethrough, means for gating said count signals to render them effective only during respective intervals when the first bit of a coded digit is in the output stage of the shift register, means responsive to a count signal for inverting said first bit in the output circuit of the register, means for skipping the shift next following said output bit, a plurality of gates having an input circuit connected to receive a count signal and an output circuit connected to respective flip-flop stages to invert the state thereof, and additional inputs to said gates for recognizing the bits of odd numbers in the register at the beginning of a count, said additional inputs being predetermined to invert respective stages in accordance with the recognized odd number to yield output bits upon succeeding shifts representing the recognized odd number plus 1.

4. Apparatus in accordance with claim 1 including means for recognizing the numeral 9 in the register when a count is to be added thereto, and means for rendering the count signal effective when the bits of the next digit are in the register to add 1 thereto.

References Cited in the file of this patent

UNITED STATES PATENTS

| | | |
|---|---|---|
| 2,852,699 | Ruhman | Sept. 16, 1958 |
| 2,997,233 | Selmer | Aug. 22, 1961 |

UNITED STATES PATENT OFFICE

CERTIFICATE OF CORRECTION

Patent No. 3,146,345 August 25, 1964

Louis S. Conover, Jr.

It is hereby certified that error appears in the above numbered patent requiring correction and that the said Letters Patent should read as corrected below.

Column 2, line 38, for "line" read -- lines --; column 4, table "(1)", second column, line 1 thereof, for "1 0 0" read -- 1 0 $\bar{0}$ --; column 5, table "(III)", second column, line 2 thereof, for "0 Î 0" read -- 0 1 Ô --; column 6, line 13, for "optput" read -- output --; line 31, for "therethruogh" read -- therethrough --.

Signed and sealed this 5th day of January 1965.

(SEAL)
Attest:

ERNEST W. SWIDER
Attesting Officer

EDWARD J. BRENNER
Commissioner of Patents